F. BROWN.
MILK STRAINER.
APPLICATION FILED AUG. 21, 1917.
1,255,701.
Patented Feb. 5, 1918.
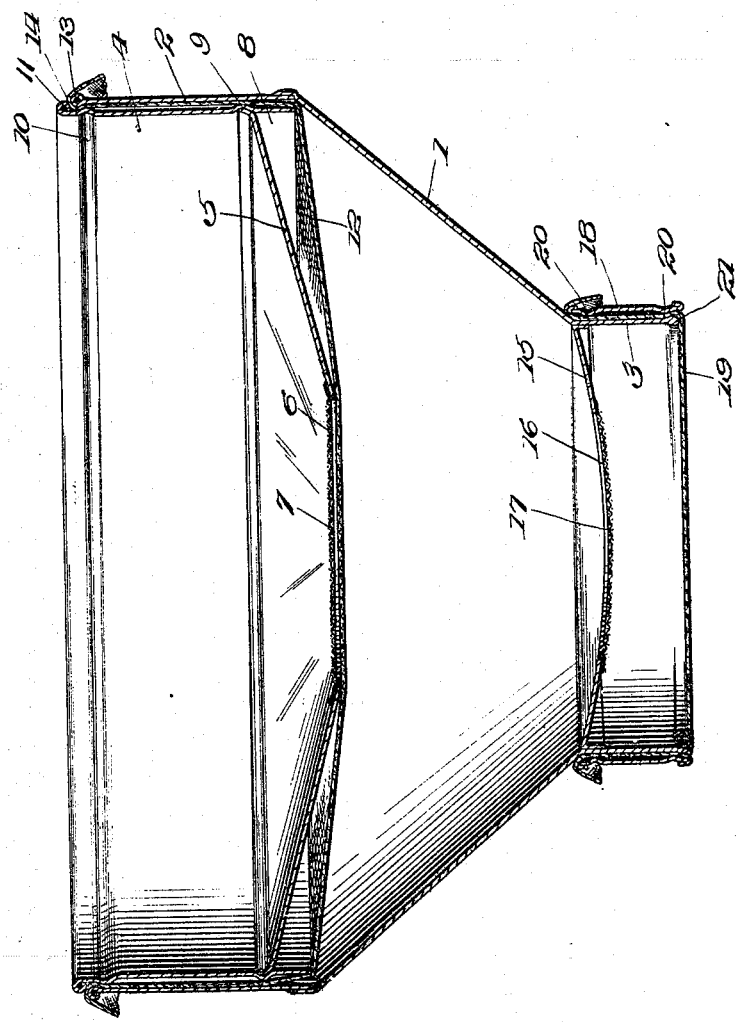
Inventor
Frank Brown
By
*[signature]*, Attorney

UNITED STATES PATENT OFFICE.

FRANK BROWN, OF ROARING SPRING, PENNSYLVANIA.

MILK-STRAINER.

1,255,701. Specification of Letters Patent. Patented Feb. 5, 1918.

Application filed August 21, 1917. Serial No. 187,423.

*To all whom it may concern:*

Be it known that I, FRANK BROWN, a citizen of the United States, residing at Roaring Spring, in the county of Blair and State of Pennsylvania, have invented certain new and useful Improvements in Milk-Strainers, of which the following is a specification.

This invention relates to milk strainers and has as one of its objects to provide a strainer so constructed that at one pouring of the milk the milk will be caused to pass through several straining mediums, in the present instance, four, so that at a single operation, the milk may be thoroughly strained and all foreign particles removed therefrom.

Another object of the invention is to provide a strainer so constructed that the several parts thereof may be readily disassembled so as to permit of them being thoroughly cleaned and sterilized after the milk has been strained.

The invention also aims to so construct the sections of the strainer that when assembled they will not be likely to become accidentally displaced with relation to one another and milk will be prevented from escaping from between the sections as is frequently the case in the use of the ordinary strainer.

The figure of the accompanying drawing is a vertical sectional view through a strainer constructed in accordance with the present invention.

The strainer embodying the invention includes a lower section having a conical or funnel shaped body 1 provided at its top with a cylindrical body portion 2 and at its bottom with a cylindrical neck 3.

The strainer further includes an upper section comprising a cylindrical body 4 having a conical or shallow funnel shaped bottom 5 provided centrally with an opening 6 over which is stretched and secured a straining screen 7 of suitable mesh. The wall of the body 4 extends below the bottom 5 to form a flange 8 surrounding the said bottom and at the point of connection of the upper edge of the bottom 5 with the said wall of the body 4, the wall of the body is formed with an outwardly stamped circumscribing bead 9 in the concave inner side of which the said upper edge of the bottom 5 is seated and secured as, for example, by solder. Also near its upper edge the wall 4 of the body is formed with an outwardly stamped circumscribing bead 10 and at its extreme upper edge the said wall of the body is overturned upon itself to form an outstanding rim 11. The upper section of the strainer is of dimensions to fit telescopically within the cylindrical body 2 of the lower section of the strainer and is of substantially the same depth as the said body 2, and stretched over the under side of the bottom 5 of the upper section and extending across the opening 6 beneath the screen 7 is a straining cloth 12, the cloth being drawn over the lower edge of the flange 8 and between the wall of the body 4 of the upper section and the wall of the body portion 2 of the lower section, as clearly shown in the drawing. The edge portion of the cloth is allowed to extend over the upper edge of the wall of the body portion 2 and it will be observed that the beads 9 and 10 firmly bind the cloth 12 against the inner side of the wall 2. In order that the upper and lower sections may be securely held against accidental separation in the use of the strainer, the upper edge of the wall of the body portion 2 is turned outwardly upon itself to form a rim 13. The formation of this rim 13 results in a slight inward bulge 14 extending entirely around the upper edge of the wall of the body portion 2 past which bulge the beads 9 and 10 may be forced by slight downward pressure upon the upper section in the act of assembling the sections prior to the use of the device. When the sections are assembled the bead 10 will seat immediately below the bulge 14 and thus the sections will be held against accidental separation.

The lower section 1 of the strainer is provided with a shallow funnel shaped bottom 15 having an opening 16 formed therein and stretched across this opening is a wire screen 17 of suitable mesh, this screen being located directly below the screen 7. The bottom 15 is located within the upper end of the neck 3 of the said lower section of the strainer and removably fitted exteriorly upon its neck is a band or collar 18 designed to stretch and retain in place a straining cloth 19 which is fitted over the lower end of the neck. In order that the straining cloth 19 may be securely gripped by the collar 18 and also to prevent accidental disengagement of the collar from the neck 3, the said collar, as in the case of the wall 4 of the body of the upper section of the strainer, is formed with stamped in beads 20 and the lower edge of the neck 3 is turned in upon itself so as to form a slight bulge 21 extending continuously around the said lower edge of the neck and serving the same purpose as the bulge 14.

From the foregoing description of the invention it will be understood that the sections comprising the strainer may be readily assembled and disassembled and that milk poured into the strainer must pass successively through the screen 7, straining cloth 6, screen 17 and straining cloth 19, so that in effect the milk at a single pouring is strained four times. It will also be understood that not only do the beads 9 and 10 and the beads 20 serve to tightly bind the straining cloth against sagging and displacement, but also that the beads 9 and 10 so tightly bind the cloth 12 as to prevent the milk escaping between the upper and lower sections of the strainer, which would otherwise be likely to occur, due to the accumulation of a volume of milk in the space between the bottom 5 of the upper section of the strainer and the cloth 19 or screen 17. It will also be apparent that the bead 9 serves not only the purposes heretofore ascribed to it but also as a means for firmly seating the upper edge of the bottom 5 of the upper section of the strainer.

It will be observed by reference to the drawings that there is a space between the bottom 5 of the upper section of the strainer and the cloth 12 extending from the opening 6 to the lower edge of the flange 8 so that when milk is poured into the upper section the cloth 12 may sag slightly, allowing a quantity of the milk to flow on to the surface of the cloth outwardly beyond the opening 6, thereby increasing the straining area of the said cloth and providing for more rapid straining of the milk.

Having thus described the invention, what is claimed as new is:

1. A strainer comprising upper and lower sections, the upper section being removably fitted into the lower section and including a bottom having a screened opening, a strainer cloth extending over the bottom and confined between the sections, the lower section having a screened opening and provided with a neck, a strainer cloth fitted over the lower end of the neck, and a band fitted exteriorly upon the neck and retaining the said cloth in place.

2. In a strainer, a lower section, an upper section telescopically fitted into the upper portion of the lower section and having a bottom provided with a screened opening, the said upper section having a depending flange, the said bottom of the upper section being concave, and a strainer cloth stretched beneath the bottom of the upper section and over the edge of the said flange with its marginal portion confined between the said sections.

In testimony whereof I affix my signature.

FRANK BROWN. [L. S.]

Copies of this patent may be obtained for five cents each, by addressing the "Commissioner of Patents, Washington, D. C."